(12) United States Patent
Blum

(10) Patent No.: US 7,469,501 B1
(45) Date of Patent: Dec. 30, 2008

(54) REMOTE INSECT CAPTURE AND DISPOSAL

(76) Inventor: Alvin S. Blum, 2350 Delmar Pl., Fort Lauderdale, FL (US) 33301

( * ) Notice: Subject to any disclaimer, the term of this patent is extended or adjusted under 35 U.S.C. 154(b) by 0 days.

(21) Appl. No.: 12/008,620

(22) Filed: Jan. 11, 2008

(51) Int. Cl.
*A01M 3/04* (2006.01)
(52) U.S. Cl. ........................................ 43/136
(58) Field of Classification Search .......... 43/136, 43/114, 133–135, 137
See application file for complete search history.

(56) References Cited

U.S. PATENT DOCUMENTS

| | | | | |
|---|---|---|---|---|
| 78,950 A * | 6/1868 | Forbes | ............... | 43/137 |
| 229,230 A * | 6/1880 | Anderson | ............ | 43/134 |
| 229,317 A * | 6/1880 | Jones | ............... | 43/135 |
| 382,580 A * | 5/1888 | Wilmot | ............. | 43/136 |
| 800,354 A * | 9/1905 | Boyd | ............... | 43/114 |
| 979,640 A * | 12/1910 | Boerngen | ............ | 43/136 |
| 1,102,829 A * | 7/1914 | Walker | ............. | 43/136 |
| 1,116,895 A * | 11/1914 | Karschner | ........... | 43/136 |
| 1,132,141 A * | 3/1915 | Wilson | ............. | 43/136 |
| 1,133,382 A * | 3/1915 | Kessler | ............ | 43/136 |
| 1,154,310 A * | 9/1915 | Hemenway | ........... | 43/136 |
| 1,174,733 A * | 3/1916 | Kelly | ............... | 43/135 |
| 1,190,165 A * | 7/1916 | Hemenway | ........... | 43/136 |
| 1,195,559 A * | 8/1916 | Clarke | ............. | 43/136 |
| 1,195,986 A * | 8/1916 | Harrison | ........... | 43/136 |
| 1,311,704 A * | 7/1919 | Northcott | .......... | 43/136 |
| 1,478,330 A * | 12/1923 | Fowler | ............. | 43/136 |
| 1,488,145 A * | 3/1924 | Bellows | ............ | 43/136 |
| 1,587,898 A * | 6/1926 | Campbell | ........... | 43/136 |
| 1,623,006 A * | 3/1927 | Hamborg et al. | ....... | 43/136 |
| 1,718,805 A * | 6/1929 | Wilkie et al. | ........ | 43/136 |
| 1,802,774 A * | 4/1931 | Nixon | ............... | 43/136 |
| 1,861,378 A * | 5/1932 | Bloodgood | ........... | 43/136 |
| 1,888,563 A * | 11/1932 | Nixon | ............... | 43/136 |
| 2,151,242 A * | 3/1939 | Souply | ............. | 43/135 |
| 2,437,447 A * | 3/1948 | Tarbell | ............ | 43/136 |
| 2,962,836 A * | 12/1960 | Hughes | ............. | 43/114 |
| 3,449,856 A * | 6/1969 | Weaver | ............. | 43/136 |
| 4,052,811 A * | 10/1977 | Shuster et al. | ....... | 43/136 |
| 4,126,959 A * | 11/1978 | Graham | ............. | 43/136 |
| 4,450,649 A * | 5/1984 | Dunwoody | ........... | 43/136 |
| 4,653,222 A * | 3/1987 | Viscosi | ............ | 43/137 |

(Continued)

FOREIGN PATENT DOCUMENTS

DE 19636247 A1 * 3/1998

(Continued)

*Primary Examiner*—Darren W Ark
(74) *Attorney, Agent, or Firm*—Alvin S. Blum

(57) ABSTRACT

A device and method for capturing a live or dead insect on a surface and disposing of the captured insect while the user's hands are remote from the insect and the insect is covered from view and captured by an adhesive sheet. A handle is at one end of an elongate tube. The adhesive sheet is removably held by a support at a second end of the tube with the adhesive surface exposed for capturing an insect. The device is operable with just a single hand on the handle. The adhesive sheet is remote from the handle. The sheet is positioned on the insect to adhesively capture the insect. The operator can then position the sheet at a suitable waste receptacle, and pressing the end of the handle releases the sheet with the insect into the waste receptacle.

10 Claims, 2 Drawing Sheets

U.S. PATENT DOCUMENTS

| | | | | |
|---|---|---|---|---|
| 4,709,503 A | * | 12/1987 | McQueen | 43/114 |
| 4,759,150 A | * | 7/1988 | Pierce | 43/136 |
| 4,787,171 A | * | 11/1988 | Dagenais | 43/137 |
| 4,817,330 A | * | 4/1989 | Fahringer | 43/136 |
| 4,905,408 A | * | 3/1990 | Wu | 43/136 |
| 4,914,855 A | * | 4/1990 | Sherman | 43/136 |
| 5,095,648 A | * | 3/1992 | Keenan | 43/136 |
| 5,454,186 A | * | 10/1995 | Gang | 43/114 |
| 5,588,250 A | * | 12/1996 | Chiba et al. | 43/114 |
| 5,634,293 A | * | 6/1997 | Mike et al. | 43/136 |
| 6,044,584 A | * | 4/2000 | Lynn | 43/136 |
| 6,055,767 A | * | 5/2000 | Carter | 43/137 |
| 6,067,746 A | * | 5/2000 | Kistner et al. | 43/136 |
| 6,185,862 B1 | * | 2/2001 | Nelson | 43/136 |
| 6,564,505 B1 | * | 5/2003 | Anderson | 43/136 |
| 6,651,379 B1 | * | 11/2003 | Nelson | 43/136 |
| 6,877,273 B2 | * | 4/2005 | Anderson et al. | 43/136 |
| 6,957,510 B1 | * | 10/2005 | Kominkiewicz | 43/136 |
| 7,065,919 B1 | * | 6/2006 | Vierra | 43/136 |
| 7,165,355 B2 | * | 1/2007 | George et al. | 43/136 |
| 7,210,265 B2 | * | 5/2007 | Jacobson | 43/136 |
| 2006/0185224 A1 | * | 8/2006 | Klein | 43/114 |
| 2008/0040967 A1 | * | 2/2008 | Young | 43/136 |

FOREIGN PATENT DOCUMENTS

| | | | | |
|---|---|---|---|---|
| DE | 10223447 A1 | * | 12/2003 | |
| GB | 2155300 A | * | 9/1985 | |
| GB | 2237492 A | * | 5/1991 | |
| GB | 2348102 A | * | 9/2000 | |
| GB | 2393893 A | * | 4/2004 | |
| JP | 03030622 A | * | 2/1991 | |
| JP | 04183350 A | * | 6/1992 | |
| JP | 05007446 A | * | 1/1993 | |
| JP | 06133678 A | * | 5/1994 | |
| JP | 07099873 A | * | 4/1995 | |
| JP | 08089150 A | * | 4/1996 | |
| JP | 09205966 A | * | 8/1997 | |
| JP | 09294522 A | * | 11/1997 | |
| JP | 10042768 A | * | 2/1998 | |
| JP | 10191866 A | * | 7/1998 | |
| JP | 2000157137 A | * | 6/2000 | |
| JP | 2000316451 A | * | 11/2000 | |
| JP | 2002119186 A | * | 4/2002 | |
| JP | 2003180224 A | * | 7/2003 | |
| JP | 2004248646 A | * | 9/2004 | |
| JP | 2006149357 A | * | 6/2006 | |
| JP | 2007135576 A | * | 6/2007 | |

* cited by examiner

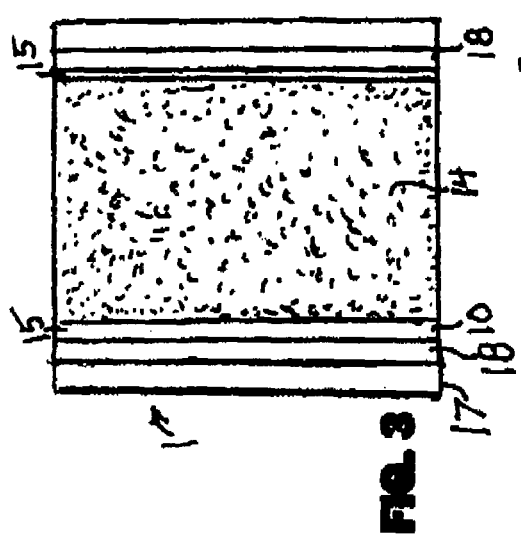
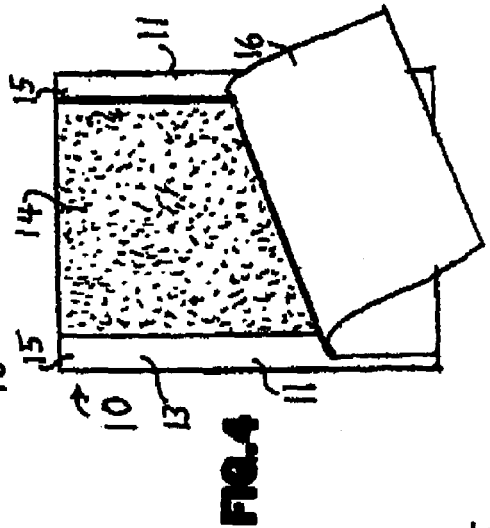
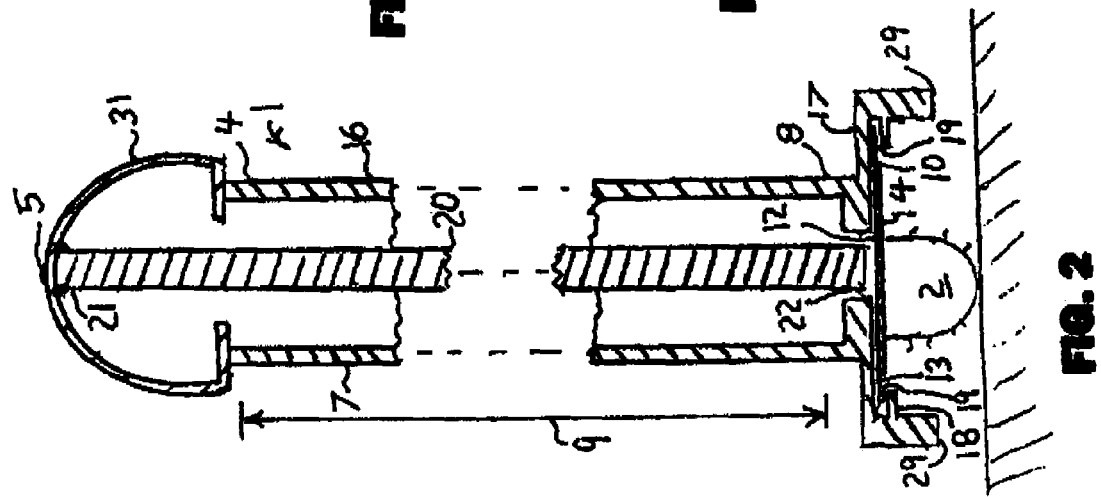
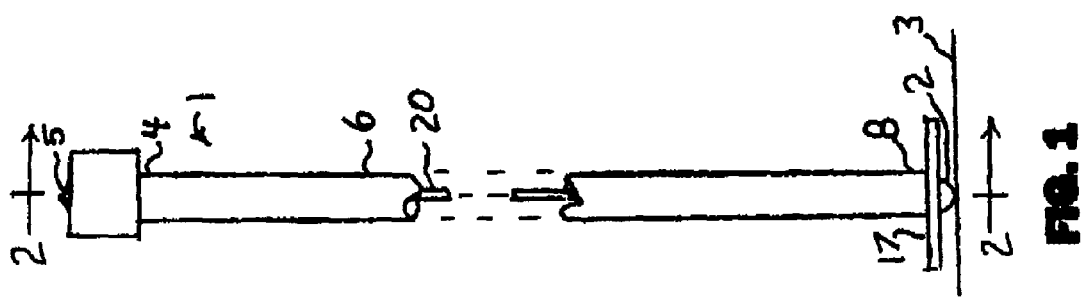

REMOTE INSECT CAPTURE AND DISPOSAL

FIELD OF THE INVENTION

This invention relates generally to apparatus and method for removing vermin from the premises, and more particularly to engaging insects such as roaches, spiders, and the like on a surface, and disposing of the insect while keeping the hands away from the insect.

BACKGROUND OF THE INVENTION

It is well known in the art to provide an adhesive means for engaging an insect with an adhesive sheet and then disposing of the captured animal while attached to the sheet. Many people are repulsed by the presence of insects, especially dead roaches and spiders. They find that getting close enough to pick up the animal, even when enveloped in an adhesive sheet is an unnerving experience.

SUMMARY OF THE INVENTION

It is accordingly an object of the invention to provide a device and method for capturing a live or dead insect on a surface and disposing of the captured insect while the user's hands are remote from the insect. It is another object that the first step in the process covers the insect from the view of the user to further avoid disturbing the user during the disposal process. The device is armed with an adhesive sheet and a release web covering the adhesive portion is first removed. The device is operable with just a single hand on the handle portion. The adhesive sheet is remote from the handle. The sheet is positioned on the insect to adhesively capture the insect. The operator can then position the sheet at a suitable waste receptacle, and press the end of the handle with a digit to release the sheet with the insect into the waste receptacle.

These and other objects, features, and advantages of the invention will become more apparent from the detailed description of an exemplary embodiment thereof as illustrated in the accompanying drawings, in which like elements are designated by like reference characters in the various drawing figures.

BRIEF DESCRIPTION OF THE DRAWINGS

FIG. 1 is a front elevation view of the invention.

FIG. 2 is a greatly enlarged sectional view taken through line 2-2 of FIG. 1.

FIG. 3 is a bottom view of the invention.

FIG. 4 is a top view of an adhesive sheet of the invention with web partially removed.

DETAILED DESCRIPTION OF PREFERRED EMBODIMENTS

Figure 5:
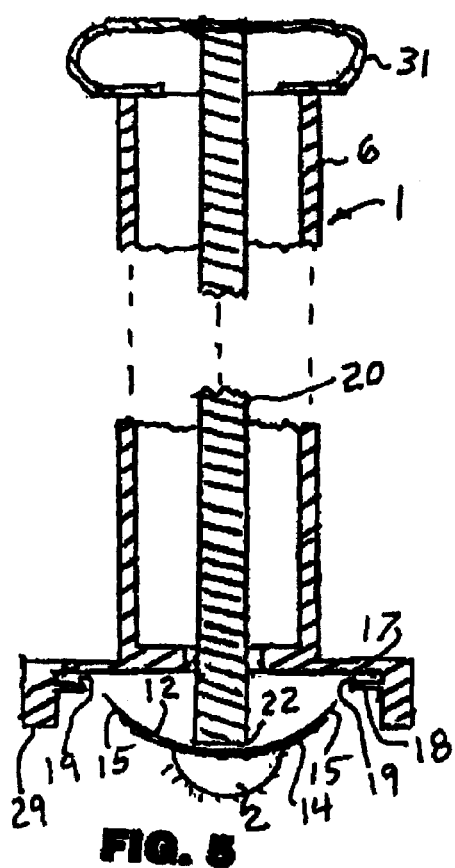
FIG. 5 is a sectional view as in FIG. 2 as the adhesive sheet with insect is being disposed.

Referring now first to the drawing FIGS. 1-5, a remote device 1 for engaging an insect 2 on a surface 3, and disposing of the insect while the hands of the user are spaced away from the insect is shown. The device 1 includes a handle portion 4, and an actuator 5 at the handle portion disposed so as to be operable by a digit of the hand holding the handle portion. An elongate spacer portion 6 having a proximal portion 7 attached to the handle portion and a distal portion 8 spaced away from the handle portion by a distance 9 of at least 25 centimeters. A plurality of disposable individual flexible adhesive sheets 10 are provided. Each sheet 10 has a pair of spaced-apart parallel side edges 11, a non-adhesive back face 12, a planar front face 13 that is coated with adhesive 14 except for a narrow non-adhesive portion 15 at each of the side edges 11, and a release web 16 protecting the adhesive. A support member 17 is affixed to the distal portion 8. The support member has holding means 18 for releasably holding one of the adhesive sheets 10 thereon with the adhesive sheet having the adhesive surface 14 exposed for adhesively engaging an insect after the release web 16 is removed. The holding means 18 is in the form of a pair of parallel paced-apart narrow grooves 19 disposed so as to releasably receive therein the parallel spaced-apart side edges 11 of the adhesive sheet that are devoid of adhesive.

An elongate operator 20 has a first end 21 operatively connected to the actuator and a second end 22 constructed for passing through the support member to engage the back face 12 of the adhesive sheet and to release the adhesive sheet from the support member after the insect is engaged, by operation of the actuator 5 that includes plastic compression spring 31, as best seen in FIG. 5. Because the sheet 10 is flexible, it bends under the force of the operator. This causes the sides 11 to retract from the grooves 19, leave the support member, and fall into a waste receptacle as desired.

Projections 29 on the support member extend beyond the planar adhesive surface when the adhesive sheet is held thereon to prevent the adhesive surface from inadvertently engaging the surface 3 on which the insect may be resting.

Figure 6:
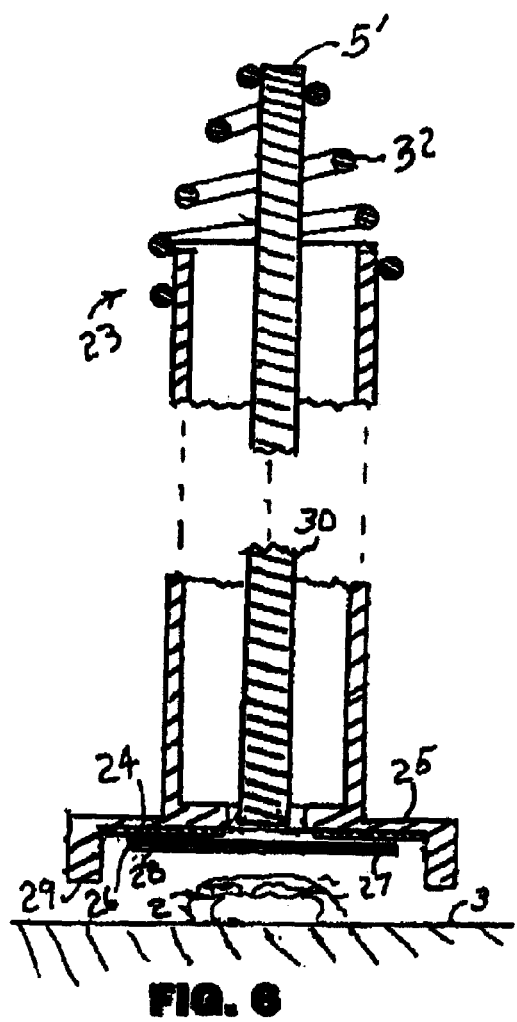
FIG. 6 is a sectional view of an alternative embodiment of the invention.

Referring now to the drawing FIG. 6, another embodiment 23 of the invention is shown having a different holding means in the form of a magnetic sheet 24 on the support 25. The adhesive sheet 26 is a thin ferromagnetic sheet such as inexpensive tin plate or painted steel sheet. The external face 27 is coated with adhesive 28, and covered with a release web (not shown) that is removed before use. The magnet holds the sheet in position until it is pushed away by the operator rod 30 as describe above. A wire compression spring 32 holds the rod 30 away from the sheet until a user's digit (thumb) depresses it and forces the rod 30 to push the sheet 26 free of the magnet for disposal. In this embodiment, the proximal end 5' of the rod 30 is the actuator that the user's digit depresses. This moves the rod 30 while compressing the spring 32 to cause the rod to push the sheet 26 free of the magnet 24.

In this embodiment, the proximal end 5' of the rod is the actuator that the user's digit depresses. This moves the rod 30 while compressing the spring 32 to cause the rod to push the sheet 26 free of the magnet 24.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A remote device for engaging an insect on a surface, and disposing of the insect while the hands of the user are spaced away from the insect, the remote device comprising:

a handle portion;

an actuator at the handle portion disposed so as to be operable by a hand holding the handle portion;

an elongate spacer portion having a proximal portion attached to the handle portion and a distal portion spaced away from the handle portion by a distance of at least 25 centimeters;

at least one adhesive sheet having a planar adhesive surface exposed for adhesively engaging an insect;

a support member affixed to the distal portion, the support member having holding means for releasably holding the at least one adhesive sheet thereon; and an elongate operator having a first end operatively connected to the actuator and a second end which passes through the support member to engage the at least one adhesive sheet and to remotely release the at least one adhesive sheet from the support member after the insect is engaged by the at least one adhesive sheet by operation of the actuator, the elongate operator movable between a first position wherein the second end is spaced above the at least one adhesive sheet and a second position wherein the second end is below the holding means and engages the at least one adhesive sheet to release it from the holding means such that the at least one adhesive sheet is completely free from the holding means.

2. The device of claim 1 further comprising projections on the support member for extending beyond the planar adhesive surface when the at least one adhesive sheet is held thereon to prevent the adhesive surface from inadvertently engaging a surface on which the insect may be resting.

3. The device of claim 2 in which the holding means comprises a pair of parallel spaced-apart narrow grooves disposed so as to releasably receive therein parallel spaced-apart side edges of the at least one adhesive sheet that are devoid of adhesive.

4. The device of claim 2 in which the holding means comprises a magnetic surface and the at least one adhesive sheet is ferromagnetic.

5. The device of claim 1 in which the holding means comprises a pair of parallel spaced-apart narrow grooves disposed so as to releasably receive therein parallel spaced-apart side edges of the at least one adhesive sheet that are devoid of adhesive.

6. The device of claim 1 in which the holding means comprises a magnetic surface and the at least one adhesive sheet is ferromagnetic.

7. A remote device for engaging an insect on a surface, and disposing of the insect while the hands of the user are spaced away from the insect, the remote device comprising:

a handle portion;

an actuator at the handle portion disposed so as to be operable by a hand holding the handle portion;

an elongate spacer portion having a proximal portion attached to the handle portion and a distal portion spaced away from the handle portion by a distance of at least 25 centimeters;

a plurality of individual flexible adhesive sheets, each sheet having a pair of spaced-apart parallel side edges, a non-adhesive back face, a front face that is coated with adhesive except for a narrow non-adhesive portion at each of the side edges, and a release web protecting the adhesive;

a support member affixed to the distal portion, the support member having holding means for releasably holding one of the adhesive sheets thereon with said one of the adhesive sheets having the adhesive surface exposed for adhesively engaging an insect after the release web is removed;

the holding means including a pair of spaced-apart narrow grooves on the support member disposed so as to releasably receive therein the parallel spaced-apart side edges of said one of the adhesive sheets that are devoid of adhesive; and an elongate operator having a first end operatively connected to the actuator and a second end constructed for passing through the support member to engage the back face of said one of the adhesive sheets and bend said one of the adhesive sheets, to thereby release said one of the adhesive sheets from the grooves and the support member after the insect is engaged, by operation of the actuator.

8. The device of claim 7 further comprising projections on the support member for extending beyond the front face coated with adhesive when said one of the adhesive sheets is held thereon to prevent the front face coated with adhesive from inadvertently engaging a surface on which the insect may be resting.

9. A method for remotely capturing and disposal of an insect utilizing the device of claim 7 comprising the following steps:

inserting said one of the adhesive sheets in the holding means;

removing the release web to expose the front face coated with adhesive;

grasping the handle portion with a hand;

applying the front face coated with adhesive to the insect to thereby capture it;

lifting the captured insect and transporting it to a disposal site by continuing to hold the device by the handle; and depressing the actuator with a digit of the hand holding the device to thereby detach said one of the adhesive sheets along with the captured insect to allow said one of the adhesive sheets to drop to the disposal site.

10. A device for remotely engaging an insect on a surface, and disposing of the insect while the hands of the user are spaced away from the insect, the remote device comprising:

a handle portion;

an elongate spacer portion having a proximal portion attached to the handle portion and a distal portion spaced away from the handle portion by a distance of at least 25 centimeters;

a plurality of individual adhesive sheets, each sheet having a non-adhesive back face, a front face that is coated at least partially with adhesive, and a release web protecting the adhesive;

a support member affixed to the distal portion, the support member having holding means for releasably holding one of the adhesive sheets thereon with said one of the adhesive sheets having the front face with adhesive exposed for adhesively engaging an insect after the release web is removed; and an elongate operator mounted for translatory motion within the spacer portion and having a first end adjacent the handle portion constructed for operation by a hand of a user while holding the handle portion, and a second end which passes through the support member to engage the non-adhesive back face of said one of the adhesive sheets to thereby forcibly remotely release said one of the adhesive sheets from the support member after the insect is engaged by the adhesive, the elongate operator movable between a first position wherein the second end is spaced above said one of the adhesive sheets and a second position wherein the second end is below the holding means and engages said one of the adhesive sheets to release it from the holding means such that said one of the adhesive sheets is completely free from the holding means.

* * * * *